United States Patent
Meyer

(10) Patent No.: US 10,618,212 B2
(45) Date of Patent: Apr. 14, 2020

(54) COEXTRUSION APPARATUS, SINGLE-LAYER EXTRUSION APPARATUS AND RETROFIT KIT AS WELL AS A METHOD FOR MEASURING A LAYER THICKNESS, FOR PRODUCING A PLASTIC FILM, AND FOR RETROFITTING AN EXTRUSION APPARATUS

(71) Applicant: Reifenhaeuser GmbH & Co. KG Maschinenfabrik, Troisdorf (DE)

(72) Inventor: Helmut Meyer, Troisdorf (DE)

(73) Assignee: REIFENHAEUSER GMBH & CO. KG MASCHINENFABRIK (DE)

( * ) Notice: Subject to any disclaimer, the term of this patent is extended or adjusted under 35 U.S.C. 154(b) by 578 days.

(21) Appl. No.: 14/868,466

(22) Filed: Sep. 29, 2015

(65) Prior Publication Data
US 2016/0096307 A1    Apr. 7, 2016

(30) Foreign Application Priority Data

Oct. 6, 2014    (DE) .......................... 10 2014 014 511

(51) Int. Cl.
| | |
|---|---|
| *B29C 48/92* | (2019.01) |
| *B29C 48/29* | (2019.01) |
| *B29C 48/285* | (2019.01) |
| *B29C 48/49* | (2019.01) |
| *B29C 48/08* | (2019.01) |

(Continued)

(52) U.S. Cl.
CPC ............ *B29C 48/92* (2019.02); *B29C 48/286* (2019.02); *B29C 48/29* (2019.02); *B29C 48/297* (2019.02); *B29C 48/298* (2019.02); *B29C 48/49* (2019.02); *B29C 48/0023* (2019.02); *B29C 48/08* (2019.02); *B29C 48/10* (2019.02); *B29C 48/21* (2019.02); *B29C 48/30* (2019.02); *B29C 48/307* (2019.02); *B29C 48/335* (2019.02); *B29C 48/362* (2019.02);

(Continued)

(58) Field of Classification Search
None
See application file for complete search history.

(56) References Cited

U.S. PATENT DOCUMENTS

| | | | |
|---|---|---|---|
| 4,943,721 A | 7/1990 | Vidrine, Jr. | |
| 6,547,551 B2 | 4/2003 | Omi et al. | |

(Continued)

FOREIGN PATENT DOCUMENTS

| | | |
|---|---|---|
| DE | 25 03 172 A1 | 8/1975 |
| EP | 1180660 A2 | 2/2002 |

(Continued)

*Primary Examiner* — Benjamin A Schiffman
(74) *Attorney, Agent, or Firm* — Tarolli, Sundheim, Covell & Tummino LLP

(57) ABSTRACT

A coextrusion apparatus, a single-layer extrusion apparatus, a retrofit kit, as well as to a method for measuring a layer thickness, for producing a plastic film, and for retrofitting an extrusion apparatus. From the state of the art, it is known to add a detection agent in the form of a fluorescent granulate into the starting material at the extruder, in order to be able to measure the layer thickness of the layer in the film composite produced from this starting material. However, it is proposed to feed in a detection agent only beyond the extruder. This leads to a clearly shorter running time of the detection agent through the system and thereby to clearly faster measurability of changes in the production parameters.

6 Claims, 1 Drawing Sheet

(51) Int. Cl.
*B29C 48/21* (2019.01)
*B29C 48/36* (2019.01)
*B29C 48/10* (2019.01)
*B29C 48/30* (2019.01)
*B29C 48/305* (2019.01)
*B29C 48/335* (2019.01)
*B29C 48/00* (2019.01)

(52) U.S. Cl.
CPC ............ *B29C 2948/92152* (2019.02); *B29C 2948/92447* (2019.02); *B29C 2948/92647* (2019.02)

(56) References Cited

U.S. PATENT DOCUMENTS

| | | |
|---|---|---|
| 7,700,019 B2 | 4/2010 | Lavoie et al. |
| 7,858,953 B2 | 12/2010 | Hughes et al. |
| 2005/0037231 A1 | 2/2005 | Jones et al. |
| 2008/0138637 A1 | 6/2008 | Yanagida et al. |
| 2009/0289199 A1 | 11/2009 | Hughes et al. |
| 2012/0321733 A1 | 12/2012 | Lauwers et al. |
| 2013/0127087 A1* | 5/2013 | Stenzel ............ B29C 47/062 264/173.17 |

FOREIGN PATENT DOCUMENTS

| | | |
|---|---|---|
| EP | 1 780 500 A1 | 5/2007 |
| EP | 2 332 714 A1 | 6/2011 |
| GB | 1 482 307 A | 8/1977 |
| GB | 2 342 310 A | 4/2000 |
| JP | S 54-82063 U | 11/1979 |
| JP | 2000-127227 A | 5/2000 |
| JP | 2008-230130 A | 10/2008 |
| JP | 4901483 B2 | 3/2012 |
| WO | 2004/051769 A2 | 6/2004 |

* cited by examiner

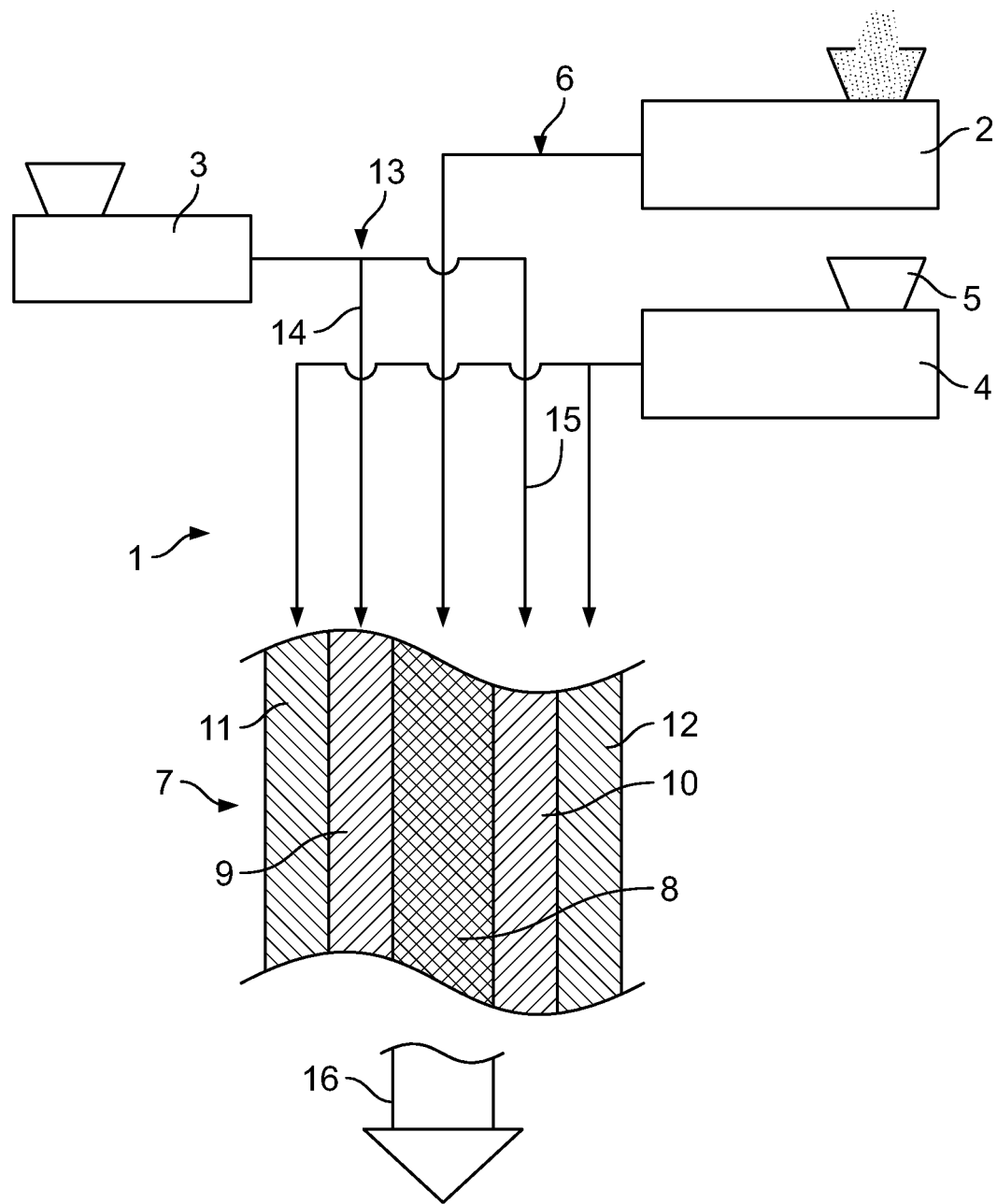
FIG.

COEXTRUSION APPARATUS, SINGLE-LAYER EXTRUSION APPARATUS AND RETROFIT KIT AS WELL AS A METHOD FOR MEASURING A LAYER THICKNESS, FOR PRODUCING A PLASTIC FILM, AND FOR RETROFITTING AN EXTRUSION APPARATUS

CROSS REFERENCE TO RELATED APPLICATIONS

Applicant claims priority under 35 U.S.C. § 119 of German Application No. 10 2014 014 511.5 filed Oct. 6, 2014, the disclosure of which is incorporated by reference.

BACKGROUND OF THE INVENTION

1. Field of the Invention

The invention relates to a coextrusion apparatus, to a single-layer extrusion apparatus, and to a retrofit kit, as well as to a method for measuring a layer thickness, for producing a plastic film, and for retrofitting an extrusion apparatus.

2. The Prior Art

Extrusion of plastic films is common practice and has proven itself for many years. A starting material, generally a plastic granulate, is plasticized, in other words conveyed, melted, homogenized, and put under pressure, with an extruder. The resulting plastic melt is passed to the extrusion block by the extruder, by way of a feed, in which block the extrusion tool, generally in the form of a broad-slit die or a round die in the case of a blown-film method, ultimately forms a film from the plastic melt. By way of being permanently drawn off, the film, in melt form, gets into a cooling region and can solidify there, for example on a cooling roll, usually referred to as a chill roll in practice, or, in the blown-film method, by means of cooling devices such as air-cooling rings.

Frequently, the starting material, i.e., a thermoplastic plastic, can produce not only single-layer films but also multi-layer film composites.

Coextrusion adapters are usually used for producing the coating. European Patent Application NO. EP 2 332 714 A1 shows such a coextrusion adapter.

In order to measure the layer thicknesses in the composite that is produced, U.S. Pat. No. 7,858,953 B2 proposes plasticizing fluorescent nanoparticles with the remaining starting material, for example plastic granulate. Such particles can subsequently be used to calculate the layer thickness, by means of a white-light interferometer.

SUMMARY OF THE INVENTION

It is therefore an object of the invention to provide an alternative or an improvement available to the state of the art.

According to a first aspect of the present invention, this task is accomplished by a coextrusion apparatus for producing a plastic film composite having multiple layers, each having a layer thickness, the apparatus having extruders, a coextrusion block, and a feed from the extruders to the coextrusion block. A first extruder is provided for plasticizing a first starting material, and a second extruder is provided for plasticizing a second starting material. A detection agent addition device is provided, which is set up for adding a detection agent for introduction into a layer, and a detection device is provided in the coextrusion block and/or beyond it, in the machine direction, and set up for undertaking a measurement of a layer thickness using the detected detection agent. The detection agent addition device is provided beyond the extruders, in the machine direction.

With regard to terms, the following shall be explained:

The "coextrusion apparatus" should be understood to mean either a part of the system or the entire system that is required for producing the plastic film composite. A system can therefore also contain further stations, such as, for example, downstream smoothing units or winders. In the smallest scope, in contrast, only the feed to the coextrusion block and the coextrusion block itself are contained in the apparatus, because such a system part can also potentially be sold to a customer, if the latter already has extruders.

The plastic film composite can particularly be present as a flat film or as a film tube when it leaves the extrusion tool.

Extruders are sufficiently known and will not be explained in any greater detail here.

The "coextrusion block" usually consists of a coextrusion adapter and of the ultimate casting tool. Coextrusion adapters are used for bringing together multiple thermoplastic materials, which usually also come from correspondingly multiple extruders. In this regard, the individual thermoplastic materials are guided, in the coextrusion adapter, as thermoplastic melts in the desired layer position, and subsequently fed to the extrusion tool for the production of the multi-layer composite. Often, there is a central channel for a central layer, and the thermoplastic materials of the other channels, fed in by way of the coextrusion channels, are disposed on the outside.

The "detection agent addition device" must be able to introduce a suitable "detection agent" in interplay with the "detection device." Usually, it is necessary, for this purpose, that the detection agent is distributed in the plastic sufficiently well, namely as homogeneously as possible. The "machine direction" describes the flow direction of the starting material or its melt through the system, all the way to the finished, cast film.

The placement "beyond the extruders" described here indicates a position at which the detection agent is introduced into the melt, which is already plasticized and is exiting from the extruder. The entire region between the exit from the extruder and the entry into the coextrusion block, i.e. at first into the coextrusion adapter of the coextrusion block, is referred to as the "feed." Usually fixed channels are present in the feed.

It is true that the arrangement proposed here appears to be unnecessarily difficult, at first: After all, if the detection agent is already introduced into the extruder in the funnel, with the granulate, it is automatically also distributed in the melt very homogeneously. In contrast, later introduction, as proposed here, usually makes it necessary to provide a further homogenization device. However, a decisive advantage is achieved in this way: Because the introduction of the detection agent takes place at a shorter distance ahead of the extrusion tool, the time required for flow of the detection agent from the introduction location to the cast foils is also shorter. In this way, it becomes possible to undertake a measurement more quickly, if a change is made in the production parameters.

The method offers a particular advantage, for example, in any case when a change is made with regard to introduction or metering of the starting material into the extruders. This is because if a non-continuous measurement is carried out, in which the detection agent is therefore introduced only at regular or irregular intervals, then it is necessary to wait from a first point in time, at which a qualitatively insufficient film layer thickness has been found, in other words at which a change in the production parameters is undertaken, until the detection agent then being funneled into the extruder leaves the tool out of the die, as a film. Scrap is produced during the entire intermediate period.

In contrast, using the present invention, it is possible to undertake heating in the tool, for example, or a mechanical setting element in the coextrusion block can be turned on, for example, which element has an influence on the layer thicknesses, and only a very short period of time until the changed thickness conditions can be determined in the extruded film elapses, if the detection agent is fed in at as short a distance as possible ahead of the extrusion die.

Preferably, the feed from the second extruder to the coextrusion block has a division that is set up for dividing melt that comes from the extruder into two separate channels, to produce two layers composed of the second starting material.

At this point, it should first be pointed out that within the scope of the present patent application, indefinite articles and numbers such as "a/one," "two," etc. should regularly be understood to mean minimum data, in other words are meant as "at least one," "at least two," etc., unless it is evident from the respective context or, better stated, wording that there, only "precisely one," "precisely two," etc. is meant.

Thus, for example, it is explicitly pointed out here that multiple extruders are supposed to be present in the coextrusion apparatus, for example two, three, four or more extruders. Also, the flow of one (in other words at least one) extruder is supposed to be divided up into two separate channels, in other words into at least two separate channels. To state it briefly, the flow of at least one extruder is divided up, so that ultimately, the extrusion tool produces multiple layers from the starting material of a single extruder.

In such systems, the present invention presents particularly great advantages:

According to the state of the art, it is not possible to measure the different—divided-up—layers of a starting material from one extruder separately from one another. In other words, in a simple case, if a central layer with two symmetrical outer layers is supposed to be produced, wherein the two outer layers are produced from the same starting material and therefore are supplied from a single extruder, it has therefore not been possible, until now, to measure the two outer layers individually, using a contact-free measurement. Instead, interferometry always determines the sum of the two outer layers and reports these. It is understood that in comparison, the present invention can bring with it significant advantages, because by feeding the detection agent in only after the extruder, it becomes possible to undertake feeding-in even after the division into separate channels. It is then possible, by means of different introduction—in terms of time or material technology—of detection agents into the divided-up channels, to undertake a measurement even of those layers that come from the same starting material and even from the same extruder.

In the case of such a constellation, with a division of the melt coming from one extruder into at least two separate channels, it is proposed that the detection agent addition device is disposed on one of the separate channels, and is set up for adding the detection agent into the feed to precisely one layer.

In this manner, one of the two layers can be measured in terms of its thickness.

Alternatively, it is conceivable that two detection agent addition devices are disposed at two of the separate channels, and are each set up for adding the detection agent into the feed to precisely one layer.

This can involve one and the same detection agent, even if the two or more feeds to the two or more layers from one and the same extruder or, in any case, composed of one and the same starting material are involved. This is because the detection agent can be fed into the separate channels with a time delay, so that the layers can be alternately measured with regard to their respective thickness.

Even a quasi-continuous measurement is possible, if, for example, the detection agent is introduced into the different channels at different, firmly predetermined intervals or rhythms. The measurement device, for example an interferometer, can be connected with a controller, and the controller recognizes what values are to be assigned to what layer, on the basis of the rhythm of the measured values. Thus, in a very simple case, one of the separate channels can be permanently enriched with detection agent during a designated measurement period, while the other of the channels is enriched only for ten seconds at a time, whereupon ten seconds of a break follow after that. The measured result then jumps between the thickness value of the feed permanently supplied with detection agent and the addition of the two layers, so that the difference between the added value and the permanent value can be calculated as the layer thickness of the intermittently supplied layer.

It should be explicitly pointed out that in a standard case, not just two extruders need to be present, but rather multiple extruders can also be present, above all in the case of films that are supposed to have more than three plies. Therefore a division can divide melt coming from an extruder into two or more channels. Alternatively and cumulatively, a division can be present in the feed from one or more extruders. In practice, there is generally a main channel that is supplied by precisely one extruder, and the further extruders supply outer layers of the film composite, wherein in the case of a symmetrical film composite, in a standard case, production of the layers outside of the central layer is undertaken, in each instance, with precisely one division of the melt feed from precisely one extruder, in each instance, to precisely two outer layers, in each instance.

A simpler measurement method results, however, if different detection agents are introduced into the separate channels of the feed of an extruder. In this case, a separate thickness can be assigned to each individual layer, even if multiple simultaneously measured layer thicknesses are present.

Preferably, the coextrusion apparatus is set up in such a manner that the extrusion tool is supposed to produce multiple layers of one and the same starting material, having the same thickness, namely, above all, the outer layers of a film composite.

In an ideal case, the entire plastic film composite produced is symmetrical.

The detection device is supposed to have a contact-free measuring instrument, in order not to damage the film, which is still hot. A white-light interferometer is proposed for this purpose.

Contact-free measurement is also possible with fluorescent detection agents having fluorescent particles, for example. An example of this can be derived from US 2005/0037231 A1. There, it is also described how a thickness measurement can take place. The thickness measurement of the layers of the plastic film composite is furthermore described in U.S. Pat. No. 7,858,953 B2, which has already been mentioned, or in EP 1 180 660 A2.

It has already been explained that the coextrusion apparatus preferably has a coextrusion adapter, which has a setting means for achieving a variable layer thickness determination. If a setting means is present, a controller on the system can produce a layer in targeted thicker or thinner manner than in the previous production method, by controlling the setting means.

It is therefore considered to be a particularly advantageous embodiment if a controller is provided that is data-connected with the detection device, and is actively connected with a layer thickness influencing means, wherein the controller is set up for carrying out regulation by means of the layer thickness influencing means, with regard to a reference value for a layer thickness.

The layer thickness influencing means can be, for example, the setting element for achieving a variable layer thickness determination in the coextrusion adapter. However, it can also be, for example, a heating means, a pump, an extruder drive, the controller of an addition means for the starting material or to the melt, and/or other means.

It is particularly interesting, in this regard, that regulation of the layer thicknesses can take place, specifically with only a very short regulation delay, because—as was already described initially regarding the first aspect of the invention—the flow-through distance from the addition site of the detection agent to the detection device beyond the extrusion tool is very short.

The coextrusion apparatus can have a broad-slit tool or a blowing head, for example.

The detection agent addition device can have a powder silo, for example, so that the detection agent can be kept on hand in powder form. Alternatively, the detection agent addition device can have a pump for liquid and preferably a tank, so that a form of detection agent already present in liquid form can be metered in.

Beyond the detection agent addition device, preferably beyond each detection agent addition device, a mixer, preferably a static mixer, can be provided in the inflow. In order to achieve the most reliable measurement of the total layer thickness possible, an attempt must be made to distribute the detection agent as homogeneously as possible in the feed to the respective layer. For this purpose, a mixer in the respective channel is practical. Because the feed takes place beyond the extruder, homogenization can no longer be undertaken by mixers provided in the extruder. A further mixer is therefore required, wherein a static mixer is particularly cost-advantageous and maintenance-free. In a simple case, for example, a package of pipes or wires can be provided in the channel.

According to a second aspect of the present invention, the invention comprises a coextrusion apparatus for producing a plastic film composite having multiple layers, each having a layer thickness, the apparatus having extruders, a coextrusion block, and a feed from the extruders to the coextrusion block. A first extruder is provided for plasticizing a first starting material, and a second extruder is provided for plasticizing a second starting material. A coextrusion apparatus is set up for producing a film composite having two layers of the same starting material, and a detection device is provided in the coextrusion block and/or beyond it, in the machine direction, and set up for undertaking a measurement of a layer thickness. The detection device is set up for undertaking a measurement of multiple layer thicknesses, preferably of multiple layer thicknesses of a starting material, and particularly preferably of all layer thicknesses. A controller is furthermore provided that is data-connected with the detection device, and is actively connected with a layer thickness influencing means. The controller is set up for carrying out regulation by means of the layer thickness influencing means, with regard to a reference value for a layer thickness.

The reference value can preferably be input into the controller manually, at an operator interface, or it can be supplied remotely by way of a data network.

According to a third aspect of the present invention, the invention comprises a single-layer extrusion apparatus for producing a plastic film having a layer thickness of the precisely one layer, the apparatus having an extruder, an extrusion tool, and a feed from the extruder to the extrusion tool. The extruder is provided for plasticizing a starting material, and a detection agent addition device is provided, which is set up for adding a detection agent for introduction into the plastic film. A detection device is provided in the coextrusion block and/or beyond it, in the machine direction, and set up for undertaking a measurement of a layer thickness on the basis of detected detection agent. The detection agent addition device is provided beyond the extruder, in the machine direction.

It is understood, on the basis of the above descriptions, that even in the case of a single-layer film production method, the short time between feeding-in of the detection agent and measuring beyond the cast film can have an advantageous effect.

With regard to the "layer thickness," it should be pointed out both for single-layer and for multi-layer production systems that the layer thickness will not be identical over the entire width of the film produced. Instead, different layer thicknesses will appear over the width; for example, a thickened location can be present, which is tool-related, for example, or which can be due to a not entirely homogeneous temperature distribution in the tool, for example.

The average value over the width, for example, can be considered the "layer thickness" within the scope of the present patent application, or a fine-raster measurement of the layer thickness over the width can be undertaken.

In order to also be able to provide a conventional extrusion apparatus with the advantageous method presented here, a retrofit kit for a coextrusion apparatus and single-extrusion apparatus can be offered, wherein the retrofit kit has a detection agent addition device and a detection device.

According to a fifth aspect of the present invention, the present invention comprises a method for measuring a layer thickness of a plastic film in an extrusion apparatus, above all in a coextrusion or single-layer extrusion apparatus, having the steps of (i) adding a detection agent to extruded starting material on the way from the extruder to an extrusion tool, and (ii) measuring the layer thickness in contact-free manner, by means of a detection agent, beyond the extrusion tool.

In order to allow the most differentiated measurement possible, it is proposed that two separate channels in the feed from an extruder to the extrusion tool are treated differently when detection agent is added.

It has already been explained that such different treatment is preferably provided for multiple channels, in each instance, preferably for all of them, in the feed of each extruder to the extrusion tool, which extruder supplies multiple layers.

The detection agent can be supplied into only one of two separate channels of the same starting material, for example.

Alternatively or cumulatively, different detection agents can be added into the feeds from different extruders and/or into separate channels of the same starting material.

Alternatively or cumulatively, the addition can be varied, particularly by means of turning the addition on and off and/or by means of switching the addition from one to the other of the separate channels of the feed of a starting material.

Preferably, measured results are provided to a controller by the detection device, whereupon the controller acts on an electronic or mechanical setting element of a layer thickness influencing means in order to achieve regulation, so that the layer thickness is regulated to be thinner if the measured results lie above a predetermined reference value, and regulated to be thicker if the measured results lie below the reference value.

A method for producing a plastic film preferably includes the measuring method indicated above, wherein preferably, regulation of the layer thicknesses takes place on the basis of the measured results obtained.

According to a seventh aspect of the present invention, the present invention comprises a method for retrofitting an extrusion apparatus for a plastic film, wherein a retrofit kit as described above is installed on the extrusion apparatus. The retrofitting method has the steps of (a) creating an opening on a feed from an extruder to an extrusion tool, (b) connecting the detection agent addition device with an addition unit in the opening, (c) sealing the opening around the addition unit or by means of the addition unit, and (d) placing the detection beyond the extrusion tool, with its measuring field directed at a designated exit region of the plastic film.

It is proposed that a plurality of detection agent addition devices and/or a plurality of addition units are connected, if a coextrusion apparatus for producing a plastic film composite having multiple layers composed of a starting material, above all of an extruder, is involved.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

The single FIGURE shows, in a rough schematic, a system, thereby an apparatus, for producing a five-layer plastic film in a symmetrical composite, having a central layer, two inner outside layers, and two outer outside layers, supplied by three extruders.

DETAILED DESCRIPTION OF THE PREFERRED EMBODIMENT

The system 1 in the FIGURE essentially consists of a first extruder 2, a second extruder 3, and a third extruder 4, each having a filling funnel 5 (indicated as an example), as well as, connected to this, a feed 6 to an extrusion tool (not shown), for example a broad-slit die, in the form of a coextrusion block.

The system 1 produces a plastic film composite 7. The plastic film composite 7 consists of the central layer 8, two inner outside layers 9, 10, as well as two outer outside layers 11, 12.

Precisely one extruder, namely the first extruder 2, supplies plastic melt (not shown) to the central layer 8 through the feed block.

The second extruder 3 and the third extruder 4 each have a division 13 (numbered as an example) in their feed 6, starting from which the melt coming from the respective extruder is passed to the two related layers through two separate channels 14, 15, therefore, in the case of the second extruder 3, to the first inner outside layer 9 and to the second inner outside layer 10.

If the layer thicknesses of the film composite 7 produced is now determined by means of white-light interferometry, then according to the state of the art, which feeds the particles into the funnels 5, only the thickness of the central layer 8 can be reliably determined. The two inner outside layers 9, 10, in contrast, just like the two outer outside layers 11, 12, can only be determined in total. If one of the two actually symmetrical layer halves deviates downward from the reference value, in each instance, but at the same time the other one deviates upward from the reference value, the sum of the measured layer thickness will not necessarily change. Therefore, it is not possible to definitely conclude from the measured values determined that a symmetrical film composite continues to be produced.

According to the invention proposed here, in contrast, particles or another detection agent can be introduced differently into the separate channels 14, 15 of the feed of an extruder, here, in other words, of the second extruder 3, but also or instead, for example, of the third extruder 4, in other words differently in terms of time, differently in terms of amount and/or with a different detection agent. In this way, it becomes possible to individually measure the individual layer 9, 10 or 11, 12 with regard to their layer thicknesses.

Accordingly, while only a few embodiments of the present invention have been shown and described, it is obvious that many changes and modifications may be made thereunto without departing from the spirit and scope of the invention.

REFERENCE SYMBOL LIST:
1 system
2 first extruder
3 second extruder
4 third extruder
5 filling funnel
6 feed
7 plastic film composite
8 central layer
9 inner outside layer on the one side
10 inner outside layer on the other side
11 outer outside layer on the one side
12 outer outside layer on the other side
13 division
14 separate channel on the one side
15 separate channel on the other side
16 machine direction and extrusion direction

What is claimed is:

1. A method for measuring a layer thickness of a plastic film in an extrusion apparatus having an extruder, comprising:
adding a detection agent to extruded starting material on the way from the extruder to an extrusion tool; and
measuring the layer thickness in contact-free manner, using the detection agent, beyond the extrusion tool,
wherein two separate channels in a feed from the extruder to the extrusion tool are treated differently when the detection agent is added, and
wherein the adding the detection agent is varied by turning addition of detection agent on and off or by switching the addition from one to another of the separate channels of the feed of a starting material.

2. The method according to claim 1, wherein the detection agent is supplied to only one of two separate channels of the same starting material.

3. The method according to claim 1, wherein different detection agents are added into feeds from different extruders and/or into separate channels of the same starting material.

4. The method according to claim 1, further comprising:
providing measured results to a controller by a detection device, whereupon the controller acts on an electronic or mechanical setting element of a layer thickness influencing unit in order to achieve regulation of a layer thickness, so that the layer thickness is regulated to be thinner if the measured results lie above a predetermined reference value, and regulated to be thicker if the measured results lie below the reference value.

5. A method for producing a plastic film, using the method according to claim 1, wherein regulation of layer thicknesses of the film takes place on the basis of measured results obtained.

6. The method according to claim 5, wherein a plurality of detection agent additional devices and/or a plurality of addition units are connected.

* * * * *